UNITED STATES PATENT OFFICE.

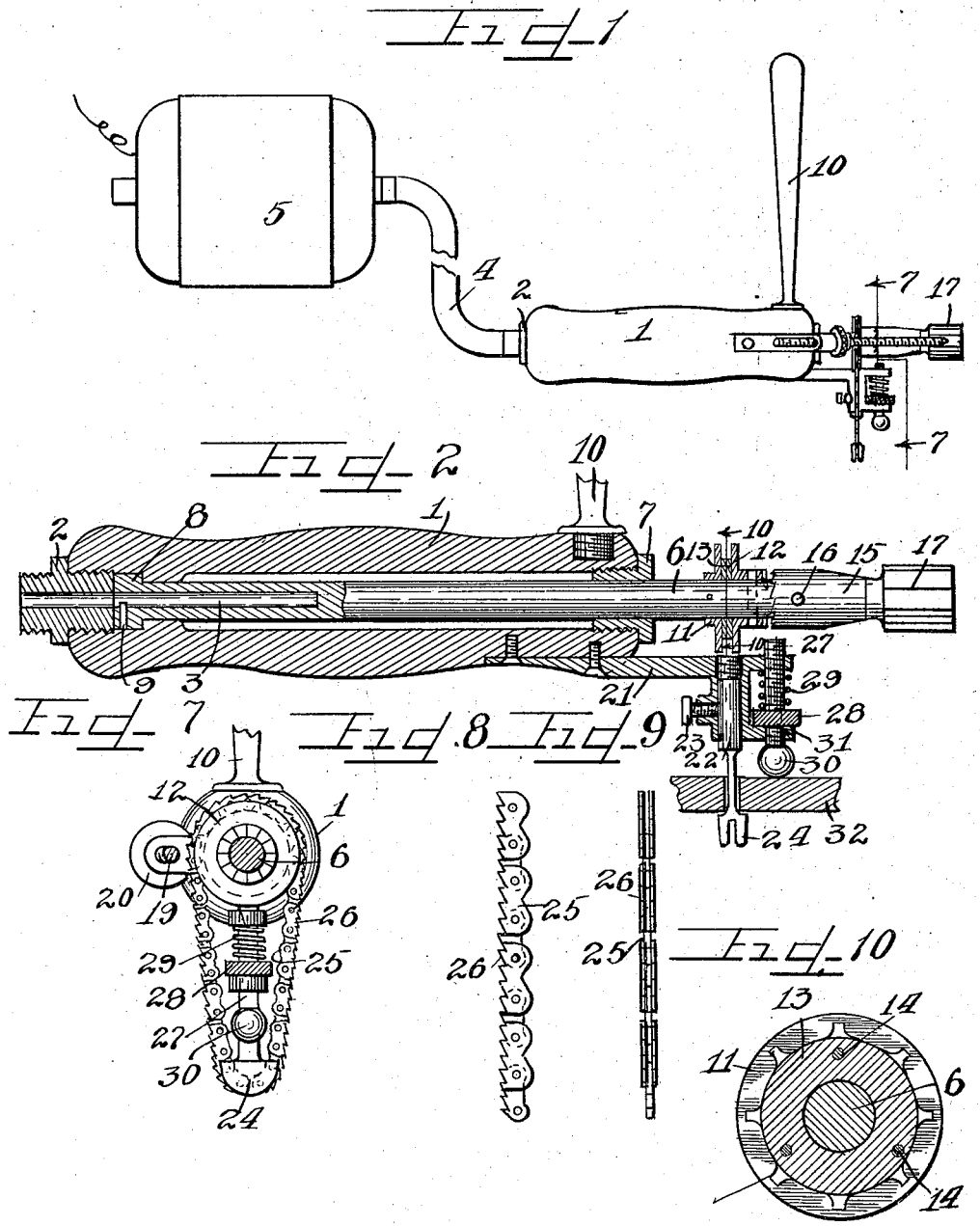

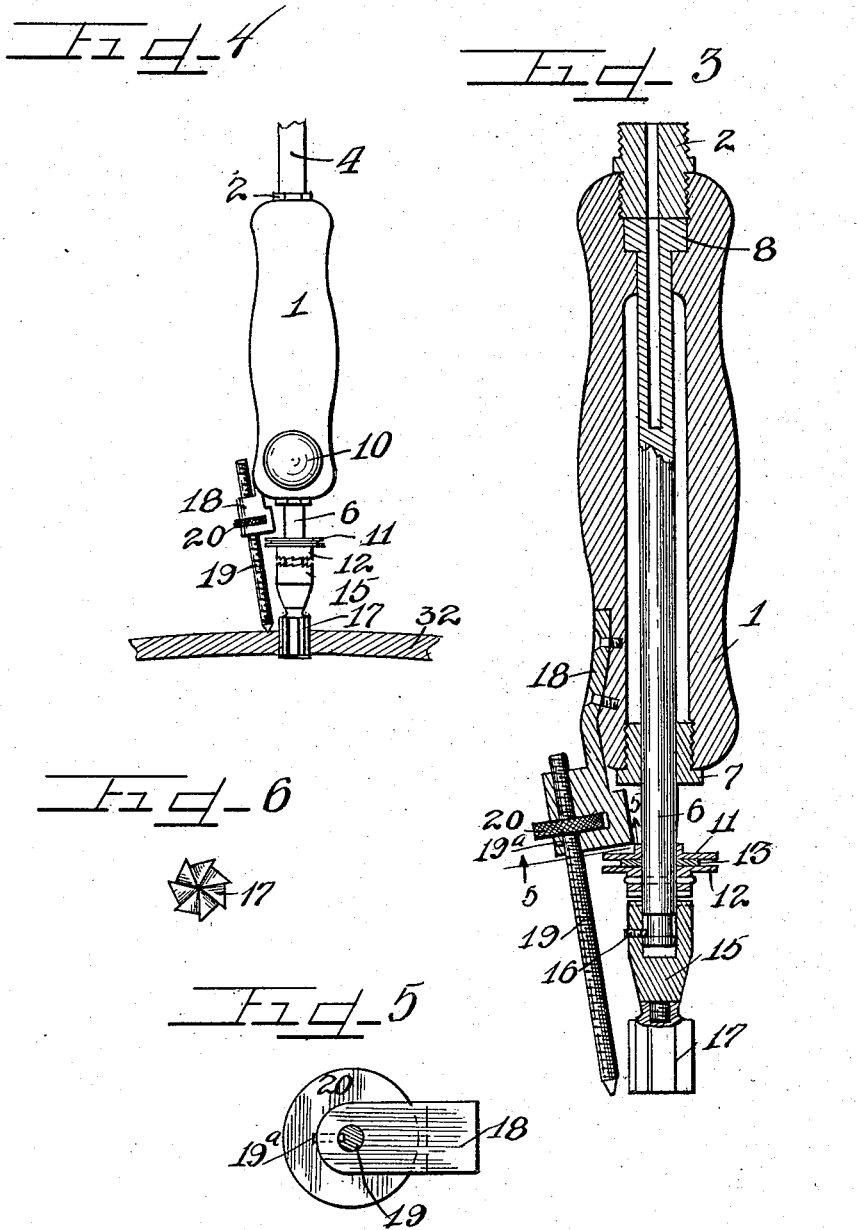

EMIL J. HOGLUND, OF CHICAGO, ILLINOIS.

BONE-CUTTING INSTRUMENT.

1,201,467.   Specification of Letters Patent.   Patented Oct. 17, 1916.

Application filed April 26, 1915. Serial No. 23,826.

*To all whom it may concern:*

Be it known that I, EMIL J. HOGLUND, a citizen of the United States, and a resident of the city of Chicago, in the county of Cook and State of Illinois, have invented certain new and useful Improvements in Bone-Cutting Instruments; and I do hereby declare that the following is a full, clear, and exact description of the same, reference being had to the accompanying drawings, and to the numerals of reference marked thereon, which form a part of this specification.

In surgical instruments heretofore constructed for the purpose of trepanning or trephining, a cylindrical or crown saw is generally used which cuts a button or disk of bone from the skull. However, the removal of a piece of bone from the skull has necessitated considerable time for the operation, as well as accuracy in directing the instrument.

By this invention a continuously driven flexible chain saw is provided which tracks over a guide member inserted through a suitable aperture in the skull first made by the drill, and disposed beneath the inner wall of the skull, so that the saw may be guided to trace any desired path to cut out a section of bone very accurately and in an exceedingly short space of time. This device is so constructed that a number of different tools may be connected therein for the different particular uses to which they are adapted, so that the various procedures of operation necessary may be followed through in proper sequence with the greatest convenience to the operator.

It is an object of this invention to construct a device having a power driven shaft to which is connected a continuous flexible saw, as well as a drilling tool, and with proper devices associated with each thereof to control the amplitude of movement in a cutting operation.

It is also an object of this invention to construct a device wherein mechanism acts to limit the movement thereof in a cutting operation to confine the cutting mechanism to a certain region, and in some instances serving to permit the loosely connected cutting mechanisms to be disentrained automatically by gravity from the driving means of the device when the correct depth of cut has been reached.

It is also an object of this invention to construct a device having cutting tools associated therewith disposed at right angles to one another and driven simultaneously, the one from the other, permitting either one to be used interchangeably with the other at any time.

It is also an object of this invention to construct a device having driven mechanisms coöperatively associated with one another and arranged at an angle to one another at one end of the device, and with handles disposed at an angle to one another to permit convenient operation of the device when using either one of said mechanisms.

It is a further object of this invention to construct a device having cutting tools associated therewith and disposed at angles to one another with driving connections between one of said tools and the other, permitting the same to be used interchangeably as the occasion requires, and with mechanisms associated with said tools for each of said cutting mechanisms to govern the movement thereof in certain directions.

It is finally an object of this invention to construct an instrument convenient to handle and simple in operation, and capable of performing a number of different operations interchangeably at the discretion of the operator.

The invention (in a preferred form) is illustrated in the drawings and hereinafter more fully described.

In the drawings: Figure 1 is a plan view of a device embodying the principles of my invention. Fig. 2 is a similar view to that shown in Fig. 1, with parts broken away and parts shown in section. Fig. 3 is a central section with parts in elevation taken through the device when in upright position for a drilling operation. Fig. 4 is a view similar to Fig. 3, with the device shown entirely in elevation. Fig. 5 is a fragmentary detail section taken on line 5—5 of Fig. 3. Fig. 6 is an end view of the cutting point or drill. Fig. 7 is a detail taken on line 7—7 of Fig. 1, showing the flexible saw. Fig. 8 is a fragmentary detail of the flexible saw. Fig. 9 is an edge view thereof. Fig. 10 is a detail section taken on line 10—10 of Fig. 2.

As shown in the drawings, the device consists of a hollow handle 1, into one end of which is threaded a bushing 2, through which projects the end of a flexible driving shaft 3, incased within a suitable flexible tube 4, and connected to a motor 5, disposed at any convenient point. A relatively long shaft 6, extends into said handle 1, through a bushing 7, threaded into the other end thereof, and is provided with an enlarged head 8, which engages behind a restricted portion within said handle and against said bushing 2, said restricted portion and bushing acting to prevent longitudinal movement of the shaft within the handle. A pin 9, extends through the head 8, of said shaft, and serves to rigidly connect the end of the flexible motor driven shaft 3 tightly within the apertured end of said shaft 6. As shown, the outer contour or surface of said handle 1, is such as to afford an easy grip for the hand of an operator, while another handle 10, is threaded thereinto at one end, and extends outwardly therefrom at right angles thereto to afford a convenient grip for an operator when the tool is used for certain other purposes. Rigidly keyed upon said shaft 6, and disposed between flanged disks 11 and 12 is a guarded sprocket wheel 13, the teeth of which are slotted, as clearly shown in Fig. 10, for a purpose hereinafter pointed out, and small pins 14, extend through said sprocket wheel and assembled flanged disk members 11 and 12, to hold the same all rigidly connected together. The outer end of the hub of said disk 12, acts as a clutch member and is provided with a series of teeth. The extremity of said shaft 6, is provided with a portion of reduced diameter, as clearly shown in Fig. 3, to receive a slidable clutch tool carrying member 15, therearound with a pin 16, extending through said member and into said reduced portion of the shaft 6, to limit the sliding movement of said member on said shaft. Said member 15, at its lower end is provided with an axial threaded projection adapted to engage a cutting tool 17, such as a drill.

For the purpose of governing the depth at which the tool 17, is allowed to penetrate, limiting means are provided to stop the downward movement of the handle portion 1, thus permitting the tool 17, and the clutch member 15, to drop free from the driving clutch member 12, when such limit of movement is reached. For this purpose a bracket 18, is secured in a suitable recess in one side of the handle 1, and is apertured and cut away at a lower extension formed thereon to receive a rod 19, loosely through the apertured portion with a knurled head 20, threaded on the rod, mounted in the cutaway portion, and fitting closely therein, so that rotation of said knurled head serves to raise or lower the rod as desired. Other mechanisms are also provided on the lower end of said handle 1, and extend outwardly from the cutting means already described substantially at right angles thereto, and embrace a continuous link saw, which is driven at a high rate of speed. For this purpose a bracket 21, is secured in a suitable recess in the lower end of said handle 1, at a point substantially ninety degrees from said bracket 18, and directly opposite the auxiliary handle 10. A stem 22, is threaded into a suitable threaded aperture extending at right angles through said bracket 21, and is adapted to be held in an adjusted position therein by means of a set screw 23. A narrow shank extends outwardly from said stem 22, and on its end is provided with a grooved guard 24, the surface at the bottom of said groove being rounded to permit a chain 25, trained about said sprocket 13, to run easily thereover. The outer edges of the links comprising said chain are provided with a series of very fine saw teeth, and the depth of the groove in the guard 24, is such that the chain tracking therethrough is prevented from contact with any object at this point. The purpose of the slotted teeth on the sprocket 13, is to permit the intermediate links of the chain saw to fit in the slots as the chain rotates around with said sprocket. Also mounted in alined apertures in extensions on said bracket 21, is a short threaded shaft 27, threaded on which is a knurled head 28, which is normally thrust toward one of said extensions by means of a compression spring 29. Said shaft is provided with a ball shaped contact head 30, a small set screw 31, being threaded through the extension on said bracket adapted to bear against said shaft 27, to lock the same in any adjusted position, so that, as shown in Fig. 2, after the guard 24, has been inserted through a suitable aperture drilled in the skull 32, the guard then tracks along on the under side of the slot sawed in the skull by the chain. Said guard is held upwardly against the under surface of the skull due to the spring impelled ball member 30, bearing on the outer surface of the skull.

The operation is as follows: When it is desired to remove a piece from the skull, generally a small cutting drill, something similar to the tool 17, shown, is held in the position shown in Fig. 4, and by pressure upon the handle, and due to the fact that the drill is rotating at a high rate of speed driven by the motor 5, the drill soon penetrates through the skull. The stop 19, limits the downward movement of the handle, so that when the downward movement ceases, the drill tool 17, automatically, after cutting a short distance beyond, disengages itself from the clutch member 12, owing to the slidable mounting of the member 15, upon the extremity of said shaft 6. The tool is then withdrawn and the guard portion 24, with the chain saw trained therearound is inserted into the aperture, and the saw, which travels at a high rate of speed, then may be moved about in any desired manner to cut a section from the skull, of course the guard member 24, tracking on the under surface of the skull with the saw teeth inclosed therewithin, and the spring impelled stop member 30, serving to hold the guard member 24, closely against the under surface of the skull.

I am aware that various details of construction may be varied through a wide range without departing from the principles of this invention, and I therefore do not purpose limiting the patent granted otherwise than necessitated by the prior art.

I claim as my invention:

1. In a device of the class described, a handle, a driving shaft journaled therein, a tool carrying member slidable on the outer end of said shaft, a combined sprocket wheel and clutch member secured on said shaft and adapted to drive said tool member, a chain saw trained about said sprocket wheel, and means for holding said saw chain extended to perform a cutting operation.

2. In a device of the class described, a handle, a driving shaft therein, a sprocket wheel on said shaft, a stem adjustably mounted on said handle in alinement with said sprocket wheel, a grooved guard at the outer end of said stem, and a saw chain trained about said sprocket wheel and moving in said grooved guard, the groove therein being of a depth sufficient to conceal completely said saw chain at the turning point.

3. In a device of the class described, a handle, a driving shaft therein, a sprocket wheel mounted on said driving shaft, flanged disks disposed on opposite sides of said sprocket wheel, a saw chain trained about said sprocket wheel and concealed between said flanged disks, a stem adjustably mounted in said handle in alinement with said sprocket wheel, and a grooved guard at the outer end of said stem receiving and guiding said saw chain, the groove therein being of a depth sufficient to conceal completely said saw chain at the turning point.

In testimony whereof I have hereunto subscribed my name in the presence of two subscribing witnesses.

EMIL J. HOGLUND.

Witnesses:
  CHARLES W. HILLS, Jr.,
  EARL M. HARDINE.

Copies of this patent may be obtained for five cents each, by addressing the "Commissioner of Patents, Washington, D. C."